US008473664B2

(12) United States Patent
Stemmer

(10) Patent No.: US 8,473,664 B2
(45) Date of Patent: Jun. 25, 2013

(54) SAFE REMOVAL OF EXTERNAL DEVICE FROM COMPUTING DEVICE

(75) Inventor: Avener Stemmer, Kfar-Edomim (IL)

(73) Assignee: Intel Corporation, Santa Clara, CA (US)

(*) Notice: Subject to any disclaimer, the term of this patent is extended or adjusted under 35 U.S.C. 154(b) by 520 days.

(21) Appl. No.: 11/637,317

(22) Filed: Dec. 11, 2006

(65) Prior Publication Data

US 2008/0140873 A1 Jun. 12, 2008

(51) Int. Cl.
*G06F 13/20* (2006.01)
*G06F 13/00* (2006.01)

(52) U.S. Cl.
USPC ............... 710/302; 710/313; 710/62; 710/72

(58) Field of Classification Search
USPC ...... 710/2, 62–64, 72–74, 300–304, 305–313
See application file for complete search history.

(56) References Cited

U.S. PATENT DOCUMENTS

| 6,292,487 | B1 * | 9/2001 | Kunito et al. | 370/395.1 |
| 6,389,560 | B1 * | 5/2002 | Chew | 714/43 |
| 6,590,597 | B1 * | 7/2003 | Kim | 715/866 |
| 6,735,720 | B1 * | 5/2004 | Dunn et al. | 714/43 |
| 6,826,703 | B2 * | 11/2004 | Kawano et al. | 713/320 |
| 6,934,774 | B1 * | 8/2005 | Sundaram et al. | 710/19 |
| 7,480,813 | B2 * | 1/2009 | Asoh et al. | 713/324 |
| 2002/0138776 | A1 * | 9/2002 | Cohen et al. | 713/320 |
| 2005/0033996 | A1 * | 2/2005 | Fong et al. | 713/300 |
| 2006/0007151 | A1 * | 1/2006 | Ram | 345/163 |
| 2006/0023242 | A1 * | 2/2006 | Fujita et al. | 358/1.13 |
| 2007/0055805 | A1 * | 3/2007 | Hayashi et al. | 710/306 |
| 2007/0299850 | A1 * | 12/2007 | Qian | 707/10 |
| 2008/0126595 | A1 * | 5/2008 | Davis et al. | 710/19 |
| 2009/0042410 | A1 * | 2/2009 | Ujii et al. | 439/62 |
| 2009/0158301 | A1 * | 6/2009 | Holan et al. | 719/321 |

* cited by examiner

*Primary Examiner* — Christopher Shin
(74) *Attorney, Agent, or Firm* — International IP Law Group, P.L.L.C.

(57) ABSTRACT

In some embodiments a computing device includes a coupler that is able to be coupled to an external device, and an eject button to signal the computing device that a user wishes to safely uncouple the external device from the computing device. Other embodiments are described and claimed.

26 Claims, 4 Drawing Sheets

SAFE REMOVAL OF EXTERNAL DEVICE FROM COMPUTING DEVICE

RELATED APPLICATION

This application is related to U.S. patent application Ser. No. 11/637,565, filed on even date herewith, entitled "Safe Removal of External Device from Computing Device", by Bradley W. Corrion.

TECHNICAL FIELD

The inventions generally relate to safe removal of an external device from a computing device.

BACKGROUND

Non-sophisticated technology users generally do not understand that simply removing an external device (for example, an external storage device or devices, and/or external memory device or devices) from a host computer can corrupt data or cause a loss of data from the device. In many cases, the host operating system (OS) is still performing operations such as queuing write transactions for the disk, for example, and may not have updated the device when the user removes the device from the host. Operating systems do typically provide utilities to prepare for the safe removal of devices. However, such operations are cumbersome and therefore take extra time to complete. For example, the Microsoft Windows operating system requires a click, a double click in the system tray, a selection from a list of devices ("which one is mine?"), a click to commence, and a click to confirm. That is, Windows takes five mouse clicks to remove the device. And those five clicks is a best case scenario that occurs only if the user finds the utility easily, and selects the correct device. In Universal Serial Bus (USB) implementations, for example, these downfalls are amplified by the implicit nature of USB devices (that they can be inserted and removed as desired). However, for storage products, for example, this is not the case.

Many computer users (for example, personal computer users) now use one or more flash memory devices that connect to the computer (for example, via a USB slot) to store data. One example of such a device is referred to as USB-Disk-on-key (DOK). When using such a disk, the user easily plugs the device into a USB-slot located on his computer (for example, a PC, a desktop, a laptop, and/or some present or future type of computing device). Using the operating system of the computer, the user can then easily access the data stored on the device. When finished using the DOK, the user needs to signal the operating system that the disk is about to be removed. In this manner, the OS will be able to flush all buffered files targeted to this device. The method to signal the OS in Microsoft Windows OS is by clicking the USB-devices icon in the notification area located on the right side of the Windows task bar. The user must first click to select the USB actions windows, and then click on the correct USB device, for example.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
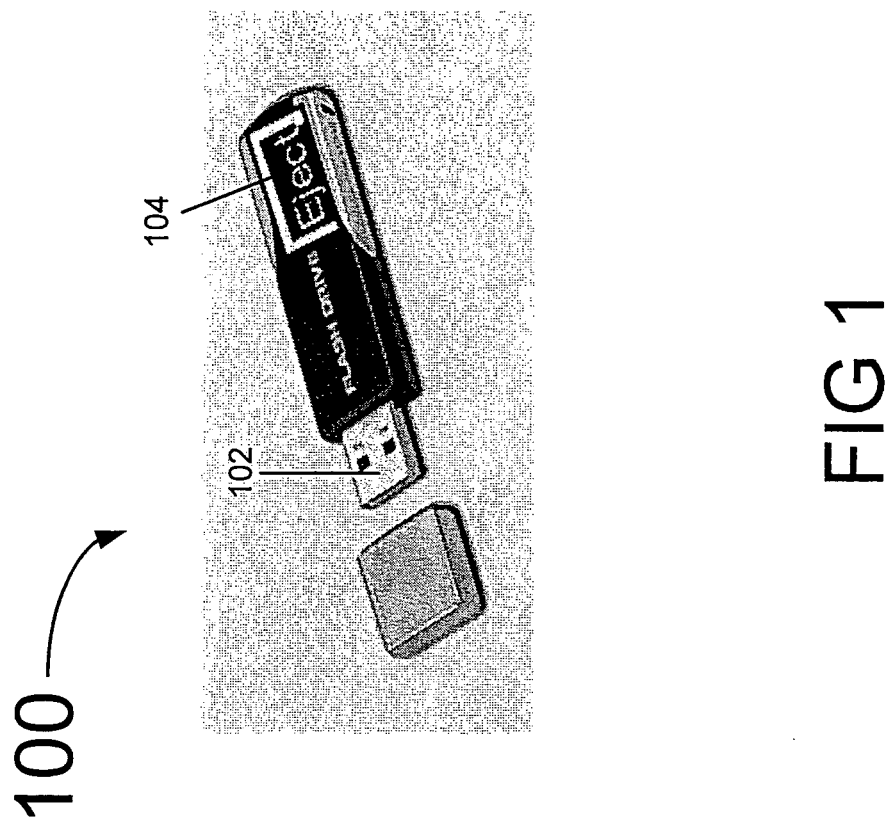
FIG. 1 illustrates a device according to some embodiments of the inventions.

Some embodiments of the inventions relate to safe removal of an external device from a computing device.

Some embodiments of the inventions relate to a physical eject button provided to indicate a desire for safe remove of external devices from computing devices.

In some embodiments an external device includes a coupler that is able to couple to a computing device, and an eject button to signal the computing device that a user wishes to safely uncouple the coupler from the computing device.

In some embodiments a signal is provided at a device indicating that a user wishes to safely uncouple the device from a computing device, and an indication is provided to the computing device that the signal has been provided in order to allow the computing device to ensure that it is safe for a user to uncouple the device from the computing device.

In some embodiments a system includes a computing device and an external device. The external device includes a coupler that is able to couple to the computing device. The external device also includes an eject button to signal the computing device that a user wishes to safely uncouple the external device from the computing device.

In some embodiments a computing device includes a coupler that is able to be coupled to an external device, and an eject button to signal the computing device that a user wishes to safely uncouple the external device from the computing device.

In some embodiments a signal is provided at a computing device indicating that a user wishes to safely uncouple an external device from the computing device, and a determination is made that it is safe for a user to uncouple the external device from the computing device in response to the signal.

In some embodiments a system includes a computing device and an external device. The computing device includes a coupler that is able to couple to the external device. The computing device also includes an eject button to signal the computing device that a user wishes to safely uncouple the external device from the computing device.

In some embodiments a mechanism prepares an external portable media device for removal from a host system by pressing a button on the device. When the user presses the button, the device will signal the host to synchronize all disk activity and un-mount the media, preparing the media for safe removal from the host system. According to some embodiments, devices that include such features could be USB flash memory "keys" or external hard disk drives such as USB or "Firewire" IEEE 1394 connected devices. According to some embodiments, applications include external flash memory adapters such that a pressing of a button makes it safe to remove a flash memory disk. According to some embodiments, applications include media devices including music players (such as Apple iPods and/or MP3 music players) and including video players. According to some embodiments, applications include any device that exposes itself as an external storage device when connected to a host computer.

It is noted that consumer electronic devices and personal computers have previously included eject buttons, but those buttons have been associated with the act of physically removing the device. For example, VCRs have eject buttons for removing a video tape, DVD players have a button associated with physically removing a DVD, and personal computers have had a button associated with removing a device such as a floppy disk, etc. Also, Apple has previously placed within its iTunes software a point on which to click to safely remove attached iPods. However, no electronic devices (either computing devices or external devices) have previously included a physical button such as an eject button that, upon pressing the button a procedure may be started through which safe removal of the device from the computing device may be implemented.

FIG. 1 illustrates a device 100 according to some embodiments. Although device 100 is illustrated in FIG. 1 as an external USB memory device, according to some embodiments, device 100 can be other types of devices. For example, according to some embodiments device 100 may be one or more of a media device, an external device, an external storage device, a portable device, a storage device, a hard drive, a memory device, a flash device, a flash memory device, a USB device, a USB hub, a music device such as a music player, a video device such as a video player, an IEEE 1394 ("Firewire") device, a USB key, a USB DOK (disk on key), a USB flash memory key, flash memory card reader and/or adapter, a portable hard drive based solution, a portable media device, an iPod, a portable music device, and/or a portable video device.

In some embodiments device 100 includes a connector 102 (or coupler) that is, for example, insertable into, connectable with, and/or able to couple with a computing device (for example, sometimes referred to as a host device). The computing device is not shown in FIG. 1, but according to some embodiments, the computing device could be any type of computing device such as, for example, a desktop computer, a laptop computer, a personal computer, a personal digital assistant (PDA), a USB hub, a cell phone, and/or any other type of computing device. In some embodiments device 100 also includes an "eject" button 104. According to some embodiments, once the device 100 is coupled with a computing device (for example, coupled using connector 102) and a user decides that they want to disconnect the device 100 from the computing device, the user presses the eject button 104. In response to the pressing of the eject button 104, the device 100 then sends a signal to the computing device that the user would like to remove (for example, disconnect, or uncouple) the device 100 from the computing device. By placing the eject button 104 on the device, the entire process of removing the device is simplified. The mere pressing of one button (for example, eject button 104) allows a signal to be sent to the computing device and, according to some embodiments, an operating system (OS) of the computing device may then confirm (in a manner similar to what is done today, for example, using Microsoft Windows operating system) that removal of the device 100 from the computing device is safe.

Figure 2:
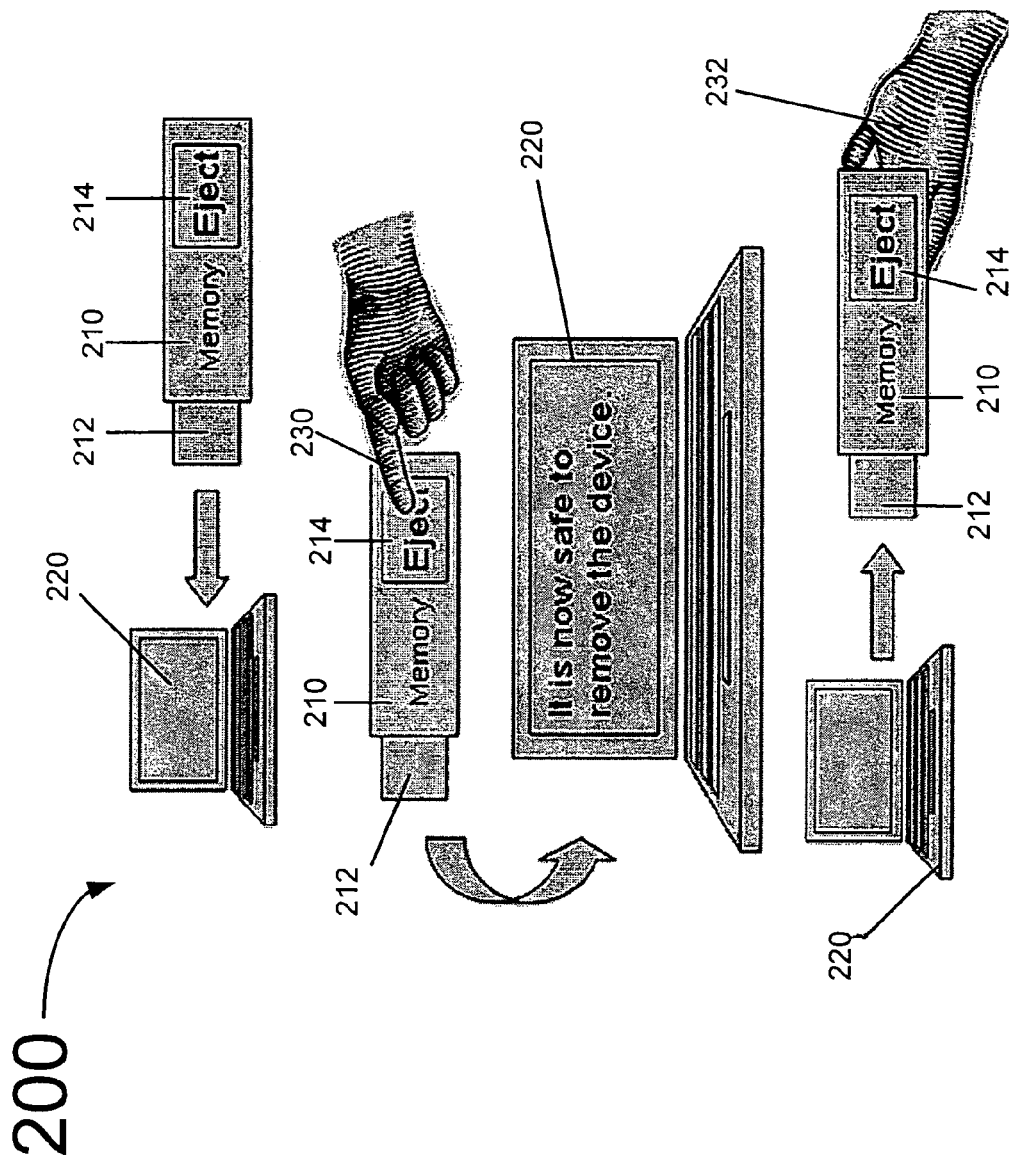
FIG. 2 illustrates a procedure according to some embodiments of the inventions.

FIG. 2 illustrates a procedure 200 according to some embodiments. As illustrated at the top of FIG. 2 a device 210 (for example, an external memory device or storage device) including a connector 212 and an eject button 214 is inserted into (and/or connected or coupled with) a computing device 220. When a user is ready to remove the device 210 from the computing device 220, the user presses the eject button 214 (for example, using the finger 230 of the user). In response to the pressing of the eject button 214, the computing device 220 receives a signal that the user wishes to remove the device 210. The computing device 220 then prepares for removal of the device 210 from the computing device 220 (for example, using the operating system of the computing device and/or other hardware and/or software). According to some embodiments, an indication is provided (for example, on a display of the computing device 220) that the device 210 is ready for removal (for example, displaying "It is now safe to remove the device"). According to some embodiments this indication may be provided by the OS of the computing device, other software, and/or hardware. Once the user receives an indication that it is safe to remove the device 210, the user safely removes the device (for example, using the hand 232 of the user).

According to some embodiments, an "eject-button" is installed next to a slot (for example, a USB slot) on a computing device (for example, an eject button next to a main USB slot on the computing device, an eject button next to every USB slot on the computing device, an eject button for a group of USB slots on a computing device, etc.) By pressing the eject button (for example, with the thumb or finger of a user), the computing device (for example, the operating system of the computing device) receives a signal that the user wishes to unplug (and/or disconnect and/or uncouple) an external device from the computing device (for example, an external USB device). Once the computing device has ensured that safe removal of the external device is now appropriate (for example, using the OS, other software and/or other hardware), a signal may be sent that it is safe to unplug the external device from the computing device. The electrical power of the external device is then turned off, for example, and a light is turned off and/or the user is signaled that the external device (for example, a USB DOK) can be unplugged, disconnected, uncoupled, etc. from the computing device. The user is then able to safely remove the external device. According to some embodiments, as far as the perception of the user is concerned, this process is similar to ejecting cassettes or disks, for example. Since the un-mount process (and/or disconnect, unplugging, and/or uncoupling process) takes a very short time (for example, less then a second to flash the buffers of the external device), the user will have the impression that the entire process happened immediately.

According to some embodiments, the user benefits from a more fluent "user experience". The user feels more comfortable and reliable using the external device since he or she can see the button at every given moment, and can unplug it at any time. For example, when a user is using a small external device to store daily work performed on their computing device, in previous implementations the user might feel annoyed when transferring files since they will need to use the computing device to find an icon to click on the computer (for example, by moving the mouse and spending time to get to the right point (for example, an icon within the status bar).

Figure 3:
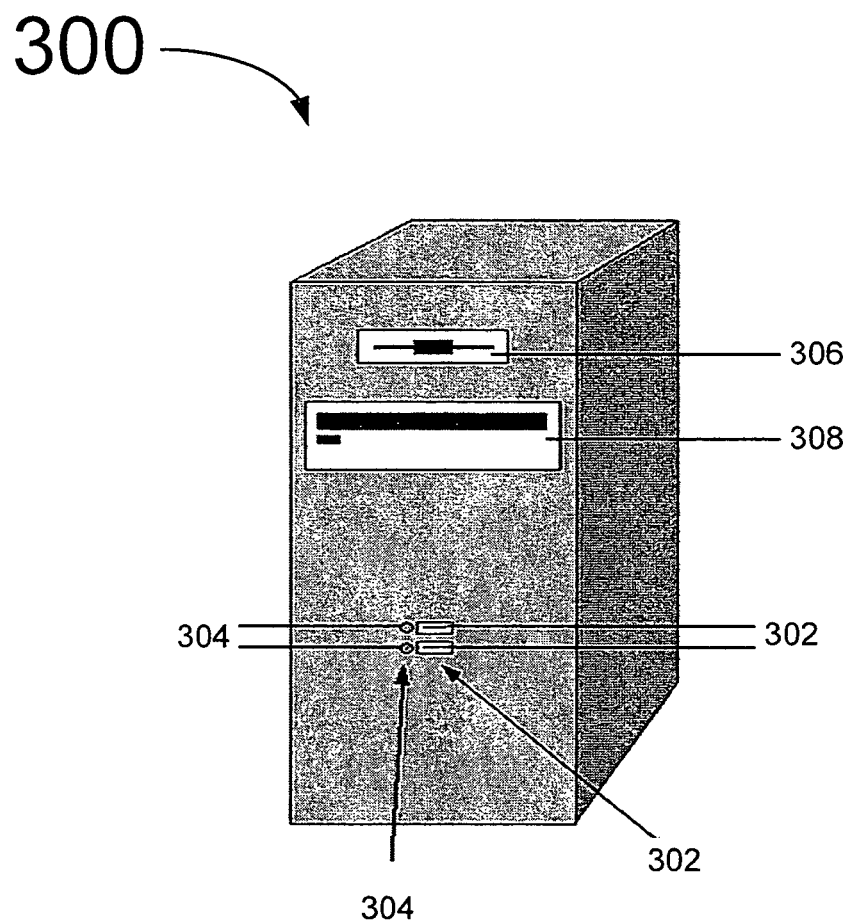
FIG. 3 illustrates a computing device according to some embodiments of the inventions.

FIG. 3 illustrates a computing device 300 according to some embodiments. In some embodiments computing device 300 includes one or more external device slots 302 (for example, USB slots) and one or more eject buttons 304. Although the computing device 300 illustrated in FIG. 3 appears as a desktop computer, for example, in some embodiments computing device 300 may be a desktop computer, a laptop computer, a personal digital assistant (PDA), a personal computer (PC), and/or any other type of computing device, for example. In some embodiments computing device 300 can also include other devices such as, for example, a floppy drive 306 and/or a disk drive 308 (for example, a CD drive and/or a DVD drive).

Figure 4:
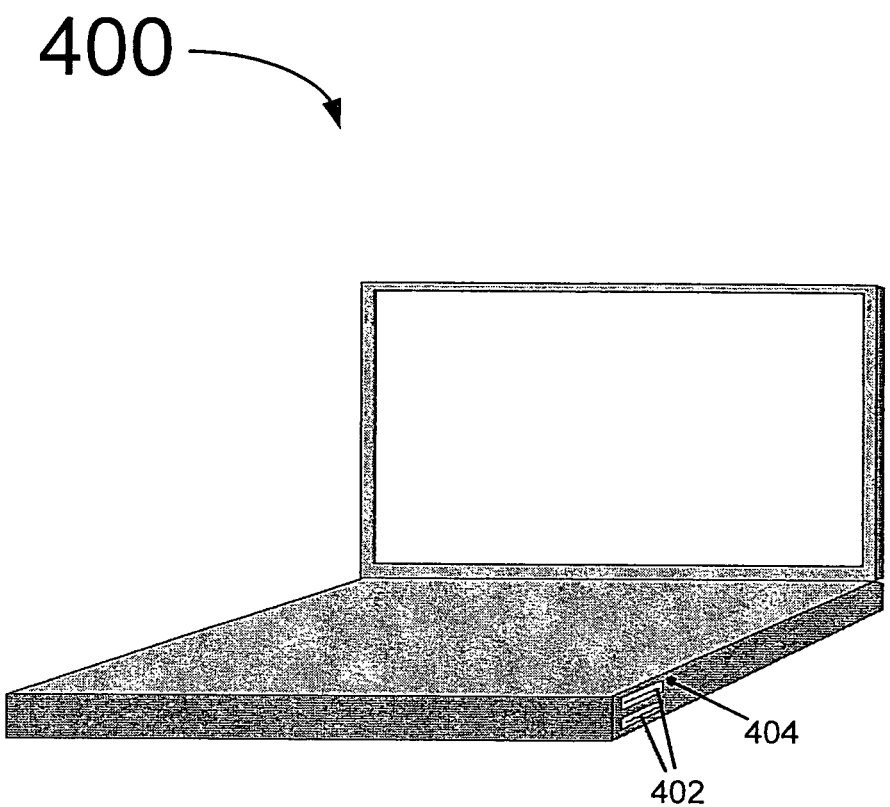
FIG. 4 illustrates a computing device according to some embodiments of the inventions.

FIG. 4 illustrates a computing device 400 according to some embodiments. In some embodiments computing device 400 includes one or more external device slots 402 (for example, USB slots) and one or more eject buttons 404.

Although the computing device 400 illustrated in FIG. 4 appears as a laptop computer, for example, in some embodiments computing device 400 may be a desktop computer, a laptop computer, a personal digital assistant (PDA), a personal computer (PC), and/or any other type of computing device, for example. In some embodiments computing device 400 can also include other devices such as, for example, a floppy drive and/or a disk drive (for example, a CD drive and/or a DVD drive).

Although the computing device 300 illustrated in FIG. 3 shows two external device slots 302 and two eject buttons 304, and the computing device 400 illustrated in FIG. 4 shows two external device slots 402 and one eject button 404, it is recognized that computing device 300 and/or computing device 400 can include according to some embodiments any number of external device slots and any number of eject buttons, and that the number of external device slot and the number of eject buttons need not be the same. Further, according to some embodiments, the external device slots and/or the eject buttons need not be located in the same area of the computing device as each other, and external device slots and/or eject buttons can be located anywhere on the computing device. For example, one or more external device slots could also be on the back of the computing device (not illustrated in FIG. 3 or in FIG. 4), either with one or more eject buttons near these external device slots or not near these external device slots. In some embodiments, one eject button is provided for all external device slots or type of external device slots. For example, according to some embodiments a computing device has one eject button for all USB slots and one eject button for all IEEE 1394 ("Firewire") slots. According to some embodiments, a computing device has one eject button for external device slots in one area of the computing device (for example, in the front, the side, the top, etc.) and one eject button for external device slots in another area of the computing device (for example, in the back of the computing device), and/or one eject button for slots on one portion (for example, the top or middle) of the front of the computing device and one eject button for slots on another portion of the front of the computing device. Many different embodiments include many different combinations of different external device slots and eject buttons.

According to some embodiments an "Eject desire" (such as an "Eject button event") is detected and a signal is sent to remove (disconnect, uncouple, etc.) an external device from a computing device (for example, a signal is sent to the OS of the computing device). According to some embodiments, the OS (for example, the OS of the computing device), software, and/or hardware verifies that it is safe to remove the external device (for example, verifying that all buffer caches were written to the external device), and then, for example un-mount the device from its file system. The un-mount (or removal) process takes a very short time if no problems arise. If problems do arise it is typically not a correctable problem, and removal of the external device is needed anyway. This short un-mount (or removal) duration (usually less than a second), will not be noticed by the user, and the user will have the impression of a fluent and easy process.

According to some embodiments, when the OS, software and/or hardware "removes" the external device, electricity is removed from the external device (for example, using Windows XP), and/or a small light on the external device is turned off. According to some embodiments, the turning off of a small light on the external device is a sign to the user that it is safe to remove the connection, coupling, etc. between the computing device and the external device (for example, by removing the external device from a slot on the computing device).

According to some embodiments, detecting an "Eject desire" (desire of the user to safely remove the external device from the computing device, for example) such as detecting an "Eject button event", and providing a signal (for example, to the OS, software, and/or hardware of the computing device) can be implemented in different ways, many of which are simple and relatively inexpensive.

According to some embodiments an I/O Controller Hub (Input/Output Controller Hub or ICH) may be a semiconductor device (for example, an ICH chip, or "South Bridge"). The ICH is typically the main interface of a computing device to I/O devices such as Integrated Drive Electronics (IDE) devices and Ethernet devices, for example. According to some embodiments, a detection of an "Eject Desire" can be connected to a pin of the ICH (for example, pin of the ICH is coupled to an eject button either directly or indirectly). According to some embodiments, a pin of the ICH is polled by the OS or signaled by an interrupt that the pin has been asserted. The OS can then "un-mount" (remove) the external device, for example by removing provision of electricity to the external device, turning off a light on the external device and/or on the computing device, providing a statement on a display of the computing device, and/or otherwise providing a signal to the user that the external device may be removed (physically or otherwise) from the computing device.

According to some embodiments an Advanced Systems Format (ASF) legacy-device is a small device which monitors specific parameter in a PC chassis, like temperature and/or fan speed, etc. These devices report their status, for example, when polled through the SMBus (System Management Bus). According to some embodiments applications and/or drivers poll these devices and report them to the user. According to some embodiments, a button such as an eject button may be implemented as an ASF legacy device which can be polled by an SMBus driver, causing the OS to un-mount (remove, etc.) an external device.

According to some embodiments an eject feature allows a user to conveniently and intuitively remove safely an external device from a computing device. According to some embodiments a user simply uses an external device which requires assurance of safe removal in a manner that is the same way a user uses a diskette, for example (for example, pushing a button to eject). The user does not need to look for a mouse, drag it to the task bar, wait for the correct device window to open, click it and wait for approval. The user merely presses an eject button, which may be located in a convenient place on the computing device chassis, display, panel, etc., and/or on the external device itself.

In addition, according to some embodiments an eject button is used for many different types of external devices (for example, many different types of USB related devices). For example, according to some embodiments the external device may be a device (for example, a USB device) that uses DC power (for example, in the USB slot) for non-computing elements (for example, lamps, cooling fans, etc.) An eject button may be used according to some embodiments by such a product for some user interface feature or features (for example, some user interface such as switch on/off, change speed, change light color etc.)

Although some embodiments have been described herein as removing, disconnecting, uncoupling, etc. external devices from a computing device, according to some embodiments these particular terms are intended to encompass many different arrangements between a computing device and an external device. For example, terms such as removing, disconnecting, uncoupling, etc. as used herein are anticipated to encompass any type of removal or physical, electrical, etc. connection or coupling between a computing device and an external device. For example, according to some embodiments, the coupling between the computing device and the external device may be a wireless connection (for example, via WiFi or WiMax, etc.). In such embodiments, for example, an eject button on the computing device, on the external device, and/or some other eject button may be used to provide the signal that a safe removal of the connection (such as a wireless connection) between the computing device and the external device is desired by a user, for example.

Although some embodiments have been described herein as using external devices such as USB devices, according to some embodiments these particular implementations may not be required. According to some embodiments, any type of device or combination of devices may be used, including but not limited to an external USB memory device, a media device, an external device, an external storage device, a portable device, a storage device, a hard drive, a memory device, a flash device, a flash memory device, a USB device, a USB hub, a music device such as a music player, a video device such as a video player, an IEEE 1394 ("Firewire") device, a USB key, a USB DOK (disk on key), a USB flash memory key, a flash memory card reader and/or adapter, a portable hard drive based solution, a portable media device, an iPod, a portable music device, and/or a portable video device.

In some embodiments the computing device is a USB hub, and/or in some embodiments the external device is a USB hub. In some embodiments a device (for example, a USB hub) is included between the computing device and the external device. In some such embodiments, for example, an eject button is included on the computing device, on the device between the computing device and the USB device (for example, a USB hub), and/or on the external device.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A computing device comprising:
    a coupler that is able to be coupled to an external device;
    an input device to signal the computing device that a user wishes to safely uncouple the external device from the computing device;
    an I/O controller hub, wherein a pin of the I/O controller hub is coupled to the input device, and the pin is asserted in response to the signal from the input device; and an operating system that, in response to the signal from the input device, prepares to safely uncouple the external device and verifies that the preparation for safely uncoupling the external device is complete.

2. The computing device of claim 1, wherein the external device is at least one of a media device, a portable device, a storage device, a hard drive, a memory device, a flash device, a flash memory device, a USB device, a USB hub, a music device, a video device, or an IEEE 1394 device.

3. The computing device of claim 1, wherein the input device is a button on the computing device.

4. The computing device of claim 1, wherein the coupler is a slot in the computing device.

5. The computing device of claim 1, the computing device to determine that it is safe for a user to uncouple the external device from the computing device in response to the signal.

6. The computing device of claim 5, the computing device to provide a signal to the user that it is safe to uncouple the external device from the computing device.

7. The computing device of claim 6, wherein the signal to the user is provided on at least one of a light on the computing device, a light on the external device, or a display on the computing device.

8. The computing device of claim 1, the computing device further including an operating system to determine that it is safe for a user to uncouple the external device from the computing device in response to the signal.

9. The computing device of claim 1, the computing device further including an Input/Output Controller Hub to determine that it is safe for a user to uncouple the external device from the computing device in response to the signal.

10. The computing device of claim 1, wherein the computing device is at least one of a desktop computer, a laptop computer, or a USB hub.

11. A method comprising:
providing a signal at an input device of a computing device indicating that a user wishes to safely uncouple an external device from the computing device, wherein a pin of an I/O controller hub of the computing device is coupled to the external device, and the pin is asserted in response to the signal from the external device;
determining that it is safe for a user to uncouple the external device from the computing device in response to the signal, wherein the determining is performed by an operating system of the computing device; and
verifying that is it safe for a user to uncouple the external device from the computing device, wherein the verifying is performed by a hardware of the computing device.

12. The method of claim 11, wherein the signal is provided in response to an input device activated at the computing device by the user.

13. The method of claim 11, further comprising providing a signal to the user that it is safe to uncouple the external device from the computing device.

14. A system comprising:
a computing device; and
an external device;
wherein the external device is able to be coupled to the computing device, the computing device further including a coupler that is able to be coupled to the external device, an input device to signal the computing device that a user wishes to safely uncouple the external device from the computing device, and an I/O controller hub with a pin of the I/O controller hub is coupled to the input device, and the pin is asserted in response to the signal from the input device, and an operating system that, in response to the signal from the input device, prepares to safely uncouple the external device and verifies that the preparation for safely uncoupling the external device is complete.

15. The system of claim 14, the computing device to determine that it is safe to uncouple the external device from the computing device in response to the signal.

16. The system of claim 15, the computing device to provide an indication to the user that it is safe to uncouple the external device from the computing device.

17. The system of claim 14, wherein the external device is at least one of a media device, a portable device, a storage device, a hard drive, a memory device, a flash device, a flash memory device, a USB device, a USB hub, a music device, a video device, or an IEEE 1394 device.

18. The system of claim 14, wherein the computing device is at least one of a desktop computer, a laptop computer, or a USB hub.

19. A computing device comprising:
a plurality of couplers able to be coupled to external devices; and
a button on the computing device, the button corresponding to the plurality of couplers and configured to signal the computing device that a user wishes to safely uncouple at least one of the external devices from the computing device;
an I/O controller hub, wherein a pin of the I/O controller hub is coupled to the button, and the pin is asserted in response to the signal from the button; and
an operating system that, in response to a signal from the button on the computing device, prepares to safely uncouple at least one of the external devices and verifies that the preparation for safely uncoupling the at least one of the external devices is complete.

20. The computing device of claim 19, wherein the plurality of couplers is on a back side of the computing device and the button is on a front side of the computing device.

21. The computing device of claim 19, wherein the button is a first button and the plurality of couplers is a first plurality of couplers, the computing device further comprising a second button on the computing device, the second button corresponding to a second plurality of couplers.

22. The computing device of claim 19, wherein the first plurality of couplers is a first type of coupler and the second plurality of couplers is a second type of coupler.

23. The computing device of claim 22, wherein the first type of coupler is a USB slot and the second type of coupler is an IEEE 1394 slot.

24. The computing device of claim 19, wherein a single button corresponds to all of the couplers of the computing device.

25. The system of claim 19, wherein the external devices comprise at least one of a media device, a portable device, a storage device, a hard drive, a memory device, a flash device, a flash memory device, a USB device, a USB hub, a music device, a video device, or an IEEE 1394 device.

26. The system of claim 19, wherein the computing device is at least one of a desktop computer, a laptop computer, or a USB hub.

* * * * *